United States Patent [19]

Koch

[11] 3,930,001

[45] *Dec. 30, 1975

[54] 2-(SUBSTITUTED)-5,6-DIHYDRO-4H-1,4-THIAZINES USED FOR THE CONTROL OF RICE BLAST

[75] Inventor: Richard C. Koch, Niantic, Conn.

[73] Assignee: Pfizer Inc., New York, N.Y.

[ * ] Notice: The portion of the term of this patent subsequent to Nov. 30, 1988, has been disclaimed.

[22] Filed: Sept. 17, 1973

[21] Appl. No.: 397,758

Related U.S. Application Data

[60] Division of Ser. No. 203,455, Nov. 30, 1971, abandoned, which is a continuation-in-part of Ser. No. 41,532, May 28, 1970, Pat. No. 3,624,217, which is a continuation-in-part of Ser. No. 788,642, Jan. 2, 1969, abandoned.

[52] U.S. Cl.................................. 424/246; 424/270
[51] Int. Cl.².......................................... A01N 9/12
[58] Field of Search................. 424/246; 260/240 D

[56] References Cited
UNITED STATES PATENTS

| 3,574,203 | 4/1971 | Conover et al. | 260/243 |
| 3,579,510 | 5/1971 | McFarland | 260/240 |
| 3,624,217 | 11/1971 | Koch | 424/246 |

FOREIGN PATENTS OR APPLICATIONS

| 1,159,450 | 12/1963 | Germany | 260/240 D |

OTHER PUBLICATIONS

Chemical Abstracts, 66:46363m, (1967).

*Primary Examiner*—Leonard Schenkman
*Attorney, Agent, or Firm*—Connolly and Hutz

[57] ABSTRACT

The control of fungal disease on rice plants by contacting the plants with a fungicidally effective amount of a composition comprising, as active ingredient, a novel compound having the formula

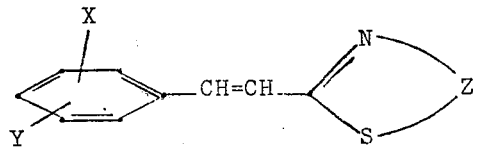

and the non-phytotoxic acid addition salts thereof, and a carrier therefor, wherein X and Y are each chloro or fluoro; and Z is ethylene or trimethylene.

5 Claims, No Drawings

2-(SUBSTITUTED)-5,6-DIHYDRO-4H-1,4-THIAZINES USED FOR THE CONTROL OF RICE BLAST

CROSS-REFERENCE TO RELATED APPLICATION

This application is a division of application Ser. No. 203,455 filed Nov. 30, 1971 and now abandoned, said latter application being a continuation-in-part of application Ser. No. 41,532 filed May 28, 1970 and now U.S. Pat. 3,624,217 and said latter application being a continuation-in-part of application Ser. No. 788,642 filed Jan. 2, 1969 and now abandoned.

BACKGROUND OF THE INVENTION

This invention relates to the use of certain novel 2-(substituted)-5,6-dihydro-4H-1,3-thiazines and 2-(substituted)-2-thiazolines as agents for the control of fungal disease on rice plants. More particularly, it relates to the use of [2-(2-substituted)vinyl]-5,6-dihydro-4H-1,3-thiazines and thiazolines for the prevention of rice blast disease on rice plants.

Rice, one of the most important cereal grains, is grown in coastal plains, tidal deltas, and river basins in temperate, tropical and semi-tropical regions. It is the staple food of a large segment of the world's population, the major part of which depends almost entirely upon rice and lives in the poorer and more thickly populated areas of the rice-growing regions.

Rice, or more correctly, the rice plant, like all field crops, is subject to a variety of diseases, the most serious of which is rice blast, a fungal disease caused by *Piricularia oryzae*. The disease is prevalent in most of the humid rice-producing regions of the world. The aerial part of the plant is attacked. The most conspicuous symptom is neck rot which is characterized by the necks breaking over. Other symptoms are the blighting or blasting of the heads, spots on the leaves, leaf sheaths and stems. The over-all result of the disease is a decrease in yield and quality of the rice. The rice plant is likewise subject to fungal disease (sheath blight) caused by *Corticium sasakii* as well as bacterial attack (leaf blight) caused by *Xanthomonas oryzae*.

Control measures appear to have developed along two principal lines, cultural and chemical. The various cultural control measures developed include production of resistant varieties of rice, timing of transplanting, clean cultivation, seed selection and controlled irrigation.

Chemical measures of control such as the use of fungicidal seed dressings and foliage fungicides are prophylactic in nature and have little if any therapeutic value. The agents most commonly used for such treatments are organic mercurials, copper sulfate, benzoquinones, naphthoquinones, thiuram disulfate, dithiocarbamates, pentachlorobenzyl alcohol and O,O-diethyl-S-benzylthiophosphate. More recently, therapeutic measures of control using antibiotics such as blasticidin, kasugamycin and blasticidin-S-benzylamino-benzene sulfonate have come into use.

Such chemical methods of control, however, are not satisfactory for one or more reasons such as a low level of effectiveness, inhibition of seed germination, tendency toward phytotoxic effects, high material costs, and in the case of mercury compounds, the presence of toxic residue on the treated crop. Additionally, the use of blasticidin requires extreme care in its use because of its toxicity.

SUMMARY OF THE INVENTION

It has been found that certain 2-(substituted)-2-thiazolines and 2-(substituted)-5,6-dihydro-4H-1,3-thiazines are effective agents for the prevention and control of fungal disease on rice plants. The present invention comprises a process for the control of fungal disease on rice plants which comprises contacting the plants with a fungicidally effective amount, in admixture with a carrier, of a compound having the formula

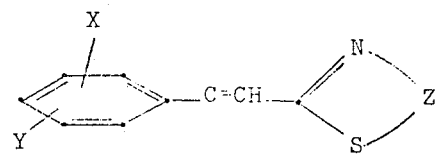

and the non-phytotoxic acid addition salts thereof wherein X and Y are each chloro or fluoro; and Z is ethylene or trimethylene.

Novel compounds of the following formula are also part of the present invention:

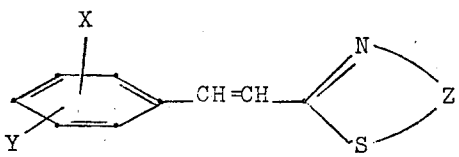

and the non-phytotoxic acid addition salts thereof wherein X and Y are each chloro or bromo; and Z is ethylene or trimethylene.

Also included within this invention are the non-phytotoxic acid addition salts of the above-named compounds. By "non-phytotoxic" acid addition salts is meant those salts which are not toxic to the rice plants or seeds at the level used to achieve antifungal action.

The non-phytotoxic acid addition salts of the above-mentioned bases which may be employed are the water soluble and water insoluble salts such as the hydrochloride, hydrobromide, phosphate, nitrate, sulfate, acetate, β,β-dimethylbutyrate, citrate, gluconate, benzoate, propionate, butyrate, sulfosalicylate, maleate, laurate, malate, fumarate, succinate, oxalate, tartrate, amsonate (4,4'-diaminostilbene-2,2'-disulfonate), pamoate (1,1'-methylene-bis-2-hydroxy-3-naphthoate), stearate, 2-hydroxy-3-naphthoate, p-toluenesulfonate and suramin salt.

DETAILED DESCRIPTION OF THE INVENTION

The compounds described herein are preferably used in the form of their free bases since they are not water soluble and thus are not washed off the plants. Additionally, the free base forms are absorbed to a greater extent by the plants than are the salt forms. The water insoluble salts of these compounds are favored over the water soluble salts precisely because of their insolubility which results in relatively longer retention on the plant compared to that of the water soluble salts.

The compounds described herein are applied with a diluent or carrier, liquid or solid, in the form of sprays, including emulsions, slurries and solutions, and as dusts. When applied to rice plants these compounds are preferably applied as sprays of solutions, slurries or emulsions containing the desired agent at a total volume of spray of from about 100 liters to about 400 liters per acre. The concentration of active ingredient in the spray can range from about 10 to about 500 parts per million (ppm).

In general, the volume of spray per acre is desirably in the range of from about 150 to about 175 liters per acre, 160 liters per acre being the preferred volume. Application at these levels is sufficient to achieve run-off and achieves substantially complete contact of the surface of the rice plant with the active ingredient. The use of water insoluble forms of these agents is preferred for foliar sprays over that of the water soluble forms to avoid their removal from the plants by rain or flooding.

For convenience and economy of application, the active ingredients are formulated into dusts, wettable powders or emulsifiable concentrates. The dusts are made by mixing the proper amount of active ingredient with a diluent or carrier such as talc, clay, calcite, pyrophyllite, diatomaceous earth, walnut shell flour, silica gel, hydrated alumina or calcium silicate to afford a concentration of active ingredient of from about 2 percent to about 4 percent by weight. The dusts can also be prepared by mixing the desired dust diluent or carrier with a solution of the active ingredient of choice in a volatile organic solvent such as benzene or acetone. The solvent is then removed by evaporation and the mixture ground.

Wettable powders, of special value for spray applications, are made by adding suitable wetting agents and conditioning agents to the dusts.

Emulsifiable concentrates are made by dissolving the active ingredient and an emulsifying agent in substantially water immiscible organic solvent. Suitable solvents are toluene, xylene and petroleum oil or an alkylated naphthalene. The volatile solvents, e.g., toluene, xylene, evaporate after spraying to leave a deposit of the active agent upon the plant. The non-volatile solvents leave an oily solution of the active ingredient upon the plant. The emulsifying agent can be cationic, anionic, or non-ionic as is well known to those skilled in the art. As suitable emulsifiers there may be mentioned soap (anionic), lauryl pyridinium chloride (cationic) and the nonionic polyoxyethylene lauryl ether (reaction product of ethylene oxide, ten moles, with dodecylalcohol, one mole). Such concentrates contain, in general, from 2 to 50 percent of the active ingredient. They are mixed with a sufficient volume of water to provide a concentration of active ingredient of from 10 to 500 ppm. For the present purpose, the resulting emulsion is applied at a rate of from about 100 to 400 liters per acre and usually at 150 to 175 liters per acre.

Of course, if a water soluble salt of the chosen active ingredient is used, it is most conveniently applied in the form of an aqueous spray. Here also, the rate of application is desirably from about 150 to 175 liters per acre of a solution containing 10 to 500 ppm. of active ingredient.

The agents described herein can also be used as fungicidal seed dressings. When used for the treatment of seeds the favored forms of these fungicides are as dusts, solutions, slurries or emulsions which are applied directly to the seed by appropriate means as by tumbling with the dust or mixing in the solution. For seed protection the levels of antifungal agent mentioned above are used, e.g., 10 to 500 ppm. of active ingredient in solutions, emulsions, sprays and 2 percent to 4 percent in dusts.

In the formulations mentioned above, as those skilled in the art will appreciate, a wide choice of diluents, emulsifiers, wetting agents or solvents, is available. The particular diluent, emulsifier, solvent or wetting agent best suited for a given formulation is readily determined by simple experiment.

Despite the fact that some of the compounds described herein exhibit phytotoxic effects to a greater or lesser degree at the higher levels of application illustrated in no way effects their usefulness for the purpose of this invention. Lower rates of application can be used with significant control of rice blast disease.

The herein described products are conveniently prepared by the direct condensation of an aldehyde R-CHO with 2-methyl-2-imidazoline or 5,6-dihydro-2-methyl-4H-1,3-thiazine at a temperature of from about 50°C. to about 150°C. in the presence or absence of a solvent which forms an azeotrope with the by-product water. Alternatively, the by-product water is removed through the use of a molecular sieve.

The following examples are provided by way of illustration.

EXAMPLE I

The protectant value of the herein described compounds against blast caused by *Piricularia oryzae* is determined by subjecting rice plants in the fully developed second-leaf growth stage to a spray of the test compound until run-off. The test compound is dissolved in a suitable solvent, e.g., water, acetone, methanol, ethanol, and diluted to the desired concentration level with deionized water containing wetting and dispersing agents, e.g., non-ionic surface active agents such as partial esters of fatty acids and hexitol anhydrides derived from sorbitol (Span 85, sorbitan trioleate), and polyoxyethylene ethers of such partial esters (Tween 80), both of which are available from Atlas Chemical Industries, Inc. These materials are used at levels of 200 ppm. and 50 ppm. in the final spray.

The treated plants are allowed to dry, then spray-inoculated with an aqueous spore suspension of *Piricularia oryzae* (200 spores/microscopic field at 100 X) to run-off, then are placed in an incubation chamber at 70°F. and 95 percent relative humidity. After about thirty hours incubation, the plants are removed to the greenhouse for disease development. Untreated inoculated controls are run at the same time. Within five days infection lesions are sufficiently developed to permit assessment of control.

The severity of the infection is determined by actual count of the number of infection lesions appearing on the treated plants compared to the lesions appearing on the control plants. Phenyl mercury acetate (PMAS, available from W. A. Cleary Corp., New Brunswick, N.J., an emulsifiable concentrate containing 10 percent phenyl mercury acetate) is used as a reference standard. Rice plants are treated with an aqueous spray of this standard material as described above at a concentration of 200 ppm. Three replicates of each test are run.

In this manner, the effectiveness of the following compounds against rice blast disease is demonstrated at various levels:

| X | Y | Z | PPM | % Control |
|---|---|---|---|---|
| 3-F | 4-F | trimethylene | 300 | 95 |
| 2-Cl | 6-Cl | trimethylene | 200 | 98 |
| 3-Cl | 4-Cl | trimethylene | 200 | 98 |
| 2-Cl | 4-Cl | trimethylene | 200 | 97 |
| 3-Cl | 4-Cl | ethylene | 500 | 59 |
| 3-F | 4-F | ethylene | 500 | 100 |
| 2-Cl | 4-Cl | ethylene | 500 | 43 |
| 2-Cl | 6-Cl | ethylene | 500 | 96 |

EXAMPLE II

A rice paddy having plants in the fully developed second-leaf growth stage is dusted with a composition comprising 4 percent by weight of trans-2-(2,4-dichlorostyryl)-5,6-dihydro-4H-1,3-thiazine benzoate as the active ingredient and 96 percent by weight of diatomaceous earth as diluent at the rate of 4 kg. dust per acre.

Two control paddies are also run. One control receives no treatment of any kind; the other is treated with phenylmercuryacetate dust at the same level of concentration.

Effective control of rice blast disease is realized in both treated paddies whereas the untreated paddy is severely attacked by the disease.

EXAMPLE III

A 14.21 g. portion (0.1 mole) of 3,4-difluorobenzladehyde and an 11.5 g. portion (0.1 mole) of 2-methyl thiazine were placed in a 250 ml. conical flask, dissolved in dry xylene, and refluxed for 10 hours. The product was contaminated with aldol and was run through an aluminum oxide column, eluting with petroleum ether, benzene, chloroform, and methanol. The product, trans-2-(3,4-difluostyryl)-5,6-dihydro-4H-1,3-thiazine, was obtained (7.9 g.) and demonstrated a melting point of 62°–63.5°C.

Anal. Calc'd for: C, 60.23%; H, 4.63%; N, 5.85%.
Found: C, 60.18%; H, 4.60%; N, 5.60%.

Example

Following the procedure of Example III the following reagents were employed:
17.5 g. (0.1 mole) 3,4-dichlorobenzaldehyde
11.5 g. (0.1 mole) 2-methyl thiazine.

The product, trans-2-(3,4-dichlorostyryl)-5,6-dihydro-4H-1,3-thiazine (m.p. 99°–101°C.) was converted to the hydrochloride by taking into ether and adding ethereal hydrochloric acid. The hydrochloride (5.76 g., pure product) had a melting point of 101°–102.5°C.

Anal. Calc'd for: C, 46.69%; H,, 3.92%; N, 4.54%.
Found: C, 46.42%; H,, 4.26%; N, 4.87%.

Example V

The following reactants were refluxed for 3 hours using dry xylene as a solvent:
17.5 g. (0.1 mole) 2,6-dichlorobenzaldehyde
11.5 g. (0.1 mole) 2-methyl thiazine.

The mixture was evaporated to dryness and taken into ether. The hydrochloride was prepared as in Example IV and 4.54 g. pure trans-2-(2,6-dichlorostyryl)-5,6-dihydro-4H-1,3-thiazine hydrochloride with a melting point of 212°–214°C. was produced.

Anal. Calc'd for C, 46.69%; H, 3.92%; N, 4.54%.
Found: C, 46.79%; H, 3.9%; N, 4.5%.

Example

Following the procedure of Example III the following reagents were refluxed in xylene for 2½ hours:
17.5 g. (0.1 mole) 2,4-dichlorobenzaldehyde
11.5 g. (0.1 mole) 2-methyl thiazine.

A crude producut (25.0 g.) was obtained which was further purified by ether extraction and divided into two portions. One portion was prepared as the hydrochloride (1.86 g. of trans-2-(2,4-dichlorostyryl)-5,6-dihydro-4H-1,3-thiazine hydrochloride, m.p. 205°–215°C.) as described in Example IV, and the other portion was basified to form the free base (1.2 g. of trans-2-(2,4-dichlorostyryl)-5,6-dihydro-4H-1,3-thiazine, m.p. 101°–103°C.

Anal. for hydrochloride Calc'd for: C, 46.69%; H, 3.92%; N, 4.54%.
Found: C, 46.56%; H, 3.86%; N, 4.54%.

Example VII

A solution of 2-methylthiazoline (6.06 g., 60 mmole) and 3,4-dichlorobenzaldehyde (10.50 g., 60 mmole) with piperidine (Ca 0.2 ml.), in 100 ml. dry benzene was refluxed using a Dean-Stark water collector.

After two days refluxing, the solution was allowed to cool. On cooling to 10°C. a crop of needles of trans-2-(3,4-dichlorostyryl)-thiazoline was obtained (m.p. 127°–128°C.).

| N.M.R. Spectrum (CDCl$_3$) | | |
|---|---|---|
| t = 8.5 cps | 3.33S triplet (2H)—S—CH$_2$—<br>4.38S triplet (2H)=N—CH$_2$—<br>6.98S singlet (2H)—CH=CH—<br>7.2–7.6S mult. (3H) benzene ring protons | further fine splitting owing to long range coupling |

Anal. Calc'd for: C, 51.17%; H, 3.51%; N, 5.43%.
Found: C, 51.09%; H, 3.50%; N, 5.45%.

Example VIII

A stirred solution of 2-methylthiazoline (6.06 g., .60 mmole) and 3,4-difluorobenzaldehyde (8.53 g., 60 mmole) with piperidine (0.2 ml.) in 100 ml. dry benzene was refluxed using a Dean Stark water separator.

After two days refluxing, the mixture was allowed to stand at room temperature for four days, was evaporated to dryness, and was recrystallized from 130 ml. ethanol. Yellow prisms of trans-2-(3,4-difluorostyryl)-thiazoline were obtained (m.p. 120.5°–121.5°C.).

| N.M.R. Spectrum (CDCl$_3$) | | |
|---|---|---|
| t = 8.5 cps | 3.33S triplet (2H)—S—CH$_2$—<br>4.38S triplet (2H)=N—CH$_2$—<br>6.97S singlet (2H)—CH=CH— | further fine splitting owing to long range coupling |

| 7.1–7.5S mult. (3H) benzene ring proton | |

Anal. Calc'd for: C, 58.64%; H, 4.03%; N, 6.22%.
Found: C, 59.94%; H, 409%; N, 6.10%.

Example IX

A solution of 2-methylthiazoline (6.06 g., 60 mmole) and 2,4-dichlorobenzaldehyde (10.50 g., 60 mmole) with piperidine (0.2 ml.) in 100 ml. dry benzene was refluxed using a Dean Stark water trap.

At the end of three days of refluxing the solution was evaporated to dryness and the pale yellow solid was recrystallized from ethanol. White needles of trans-2-(2,4-dichlorostyryl)thiazoline were obtained (m.p. 116.5°–119°C.).

| N.M.R. Spectrum (CDCl₃) | | |
|---|---|---|
| t = 8.5 cps | 3.32S triplet (2H)—S—CH₂—<br>4.36S triplet (2H)=N—CH₂— | further fine splitting owing to long range coupling |
| t = 17 cps | 6.62, 6.98S pr doublets (5H)—CH=CH—<br>7.1–7.6S mult. benzene ring protons | |

Anal. Calc'd for: C,, 51.17%; H, 3.51%; N, 5.43%.
Found: C, 51.00%; H, 3.65%; N, 5.57%.

Example X

A solution of 2-methylthiazoline (6.06 g., 60 mmole) and 2,6-dichlorobenzaldehyde (10.50 g., 60 mmole) with piperidine (0.2 ml.) in 100 ml. dry benzene was refluxed using a Dean Stark water trap.

At the end of five days refluxing the mixture had darkened and charcoal was added. The solution was evaporated to an oil, taken up in ethanol, filtered and recrystallized from ethanol/hydrochloric acid. Off-white microcrystals of trans-2-(2,6-dichlorostyryl)-thiazoline hydrochloride were obtained (m.p. 173°–176°C.).

| N.M.R. Spectrum (CF₃COOH) | | |
|---|---|---|
| t = 9 cps | 3.90S triplet (2H)—S—CH₂—<br>4.62S triplet (2H)=N—CH₂— | further fine splitting owing to long range coupling |
| t = 16 cps | 7.68, 8.13S pr. doublets (2H)—CH=CH—<br>7.36S sharp mult. (3H) benzene ring protons | |

Anal. Calc'd for: C, 44.83%; H, 3.08%; N, 4.73%.
Found: C, 45.15%; H, 3.04%; N, 04.96%.

Example XI

The salts of the products of the preceding examples are neutralized to their free bases and the resulting bases converted to acid addition salts by treatment with an equimolar proportion of the appropriate acid in methanol as solvent. The salts are recovered by precipitation with a nonsolvent, e.g., ether, hexane, or, alternatively, if desired, by evaporation of the solvent. The following salts are thus prepared: p-toluene-sulfonate, pamoate, amsonate, 2-hydroxy-3-naphthoate, stearate, citrate, gluconate, benzoate, acetate, proprionate, butyrate, sulfate, nitrate, phosphate, hydrobromide, β,β-dimethylbutyrate, maleate, oxalate, succinate, malate, tartrate and fumarate.

What is claimed is:

1. A process for the control of fungal disease on rice plants which comprises contacting the plants with a fungicidally effective amount, in admixture with a carrier therefor, of a compound having the formula

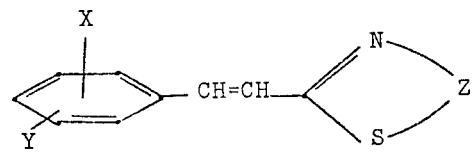

or a non-phytotoxic acid addition salt thereof wherein X and Y are each chloro or fluoro; and Z is trimethylene.

2. The process of claim 1 wherein X is 2-chloro and Y is 4-chloro.

3. The process of claim 1 wherein X is 2-chloro and Y is 6-chloro.

4. The process of claim 1 wherein X is 3-chloro and Y is 4-chloro.

5. The process of claim 1 wherein X is 3-fluoro and Y is 4-fluoro.

* * * * *